(12) United States Patent
Kappenberger et al.

(10) Patent No.: US 6,345,269 B1
(45) Date of Patent: Feb. 5, 2002

(54) SYSTEM AND METHOD FOR COMMUNICATING WITH VARIOUS ELECTRONIC ARCHIVE SYSTEMS

(75) Inventors: Torsten Kappenberger, Karlsruhe; Erwin Vicari, Steinenbronn, both of (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/276,965

(22) Filed: Mar. 26, 1999

(30) Foreign Application Priority Data

Mar. 31, 1998 (DE) .......................................... 198 14 348

(51) Int. Cl.[7] .............................................. G06F 17/30
(52) U.S. Cl. ........................ 707/3; 707/2; 707/4; 707/5
(58) Field of Search ................................ 707/2, 3, 4, 5

(56) References Cited

U.S. PATENT DOCUMENTS

| | | | | |
|---|---|---|---|---|
| 5,715,453 A | * | 2/1998 | Steward | 707/104 |
| 5,778,373 A | * | 7/1998 | Levy et al. | 707/100 |
| 5,845,276 A | * | 12/1998 | Emerson et al. | 707/2 |
| 6,006,221 A | * | 12/1999 | Liddy et al. | 707/5 |
| 6,134,559 A | * | 10/2000 | Brumme et al. | 707/103 |
| 6,212,537 B1 | * | 4/2001 | Nosohara | 707/356 |
| 6,233,584 B1 | * | 5/2001 | Purcell | 707/103 |

* cited by examiner

Primary Examiner—Frantz Coby
(74) Attorney, Agent, or Firm—Ohlandt, Greeley, Ruggiero & Perle, L.L.P.; Ingrid M. Foerster, Esq

(57) ABSTRACT

A system and method that communicates with archive systems that use various query languages. The system includes an interpreter, which receives an inquiry in a non-archive-system-specific form, converts the inquiry into an archive-system-specific form or allocates it to an archive-system-specific form and executes the inquiry in a selected archive system. Processing of the search results, management of the interface with the archive system and the pertinent administrative work is undertaken by the interpreter. The knowledge required of a user regarding the individual archive systems is reduced to a minimum. The various interfaces of the interpreter make it possible to use source code for different archive systems with few modifications.

21 Claims, 7 Drawing Sheets

SYSTEM AND METHOD FOR COMMUNICATING WITH VARIOUS ELECTRONIC ARCHIVE SYSTEMS

FIELD OF THE INVENTION

The present invention relates to an interpreter architecture for communicating with various archiving systems.

BACKGROUND OF THE INVENTION

To be able to search in electronic archiving systems for documents of any kind, it is necessary to create search masks for the input of search parameters or to use already existing search masks. These search masks need a certain functionality (e.g. carrying out document searches, processing search results etc.).

Every archiving system has its own search mask or masks and its own query language; no standard user interface exists for accessing different archiving systems. FIG. 1 shows a communications architecture such as is frequently implemented in companies, banks and insurance companies. The communications architecture consists, for example, of the archiving systems Visual Info, DB2, EDMS and a general database. Since different archiving systems of different manufacturers are involved, communication between the user and the archiving system can only take place via an API (Application Programming Interface) or a special query language to the respective archiving system.

FIG. 2 shows a communications architecture consisting of various archiving systems as depicted in FIG. 1. A dedicated query language SQL exists in the IBM DB2archiving system. The Visual Info archiving system uses a C-API interface or a graphical user interface. The EDMS archiving system on the other hand has a file-based API interface as a query language. If a company or a bank has various archiving systems in use, or if locally distributed archiving systems are accessed via a data line, a dedicated user interface (search mask) and a dedicated API must be programmed for each archiving system to be able to communicate with this archiving system. Many archiving systems (e.g. Visual Info) now offer simple, permanently implemented user interfaces or search masks. However, other archiving systems are available which do not supply this option (e.g. EDMS, solutions with archive functions such as EDMSuite). In systems of this kind, search masks have to be created afresh individually for each search request. This involves a considerable time outlay, since these archive systems use complicated individual algorithms for the most part. The user who has to look for documents in various electronic archive systems therefore has to master the different interrogation options of the respective archive systems. Since the interrogation systems are very different in terms of their operation and several different interrogation options also exist, users are often overtaxed.

The problems for the creation of search masks are illustrated in greater detail taking the EDMS archiving system as an example. EDMS is an OS/390-based archive system, which contains the subsystems CICS and DB2. Searching in this system is performed via a very flexible host dialog. The panels responsible for this can be executed on CICS. Decentralized archiving systems can be connected on the one hand in EDMS, while on the other hand interfaces are offered to be able to forward decentralized searching to the EDMS.

Owing to the fact that PWS (Personal Work Station) applications are also intended to access the EDMS, a GUI (General User Interface) has to be created which has the complete functionality of the host application.

The GUI is the higher-ranking structure and represents the complete program on the PWS. It contains several search masks, one search mask being written for one object family.

One problem which exists on the host and the PWS side is that when a new object family is introduced (integration of new document types), the search mask and the connection set-up between the host and PWS side always has to be re-coded, which always involves a large amount of work.

SUMMARY OF THE INVENTION

The object of the present invention is to provide a system and method which makes it possible to communicate with a large number of different archiving systems with different query languages without having to know their query languages when implementing a search request, and which enables search requests to be adapted simply to user-specific requirements.

One basic advantage of the present invention is that the development time for a search mask with the pertinent functionalities is reduced to a minimum.

Processing of the search results, management of the interface with the archive system and the accompanying administrative tasks are undertaken by an interpreter. The interpreter in accordance with the invention offers an interface for various archive systems. The knowledge required regarding the individual archive systems is reduced to a minimum. A user can thus operate several systems. The various interfaces of the interpreter in accordance with the invention make it possible to re- use source code for different archive systems with few modifications.

BRIEF DESCRIPTION OF THE DRAWINGS

The present invention is explained in greater detail with reference to a preferred practical example, where.

DETAILED DESCRIPTION OF THE INVENTION

Owing to the variety of different archive systems, a large number of different and specific interfaces result. To provide a standard interface, the present invention proposes the use of an interpreter. The non-archive-system-specific interpreter query language allows a user interface, search criteria and archive-specific parameters to be defined for inquiries regarding documents in archive systems.

Generation of the search mask and translation of the search criteria are undertaken by an interpreter, which has the following functionalities:

It must recognize and store the archive-system-specific part of the language.

It must input the search parameters, and assign a defined type to them (e.g. integer, string, floating point . . . )

It must construct the search mask (graphical user interface). This is carried out in accordance with the parameters specified in the program.

Before a search is begun, the interpreter verifies whether all the parameters of the search mask which have been entered (e.g. format of the values input (e.g. integer, string..)) and whether the logic operations between the individual parameters are correct.

Once the interpreter has established that the parameters entered are correct, the search can be started in the archive system. In order to detect which type of archive system is involved, the data from the archive-system-specific part of the language are used. The interpreter recognizes from these data which interface has to be used with the archive system.

The interpreter must then show the result of the search to the user, and enable him to select certain documents from it.

The documents selected by the user are fetched by the interpreter from the archive system and made available to him. Display of the documents has to be undertaken by the system browser.

The work of the interpreter can be divided into two parts. In the first part (Point 1 to Point 4), the archive-system-specific details from the source code are required, while the second part (Point 5 to Point 7) is "independent" of these.

This results in tasking which is untypical of an interpreter. On the one hand, a source code is to be interpreted, and on the other a "static" part is always executed. Viewed thus, the interpreter in accordance with the invention exceeds the typical interpreter functionalities.

Figure 1:
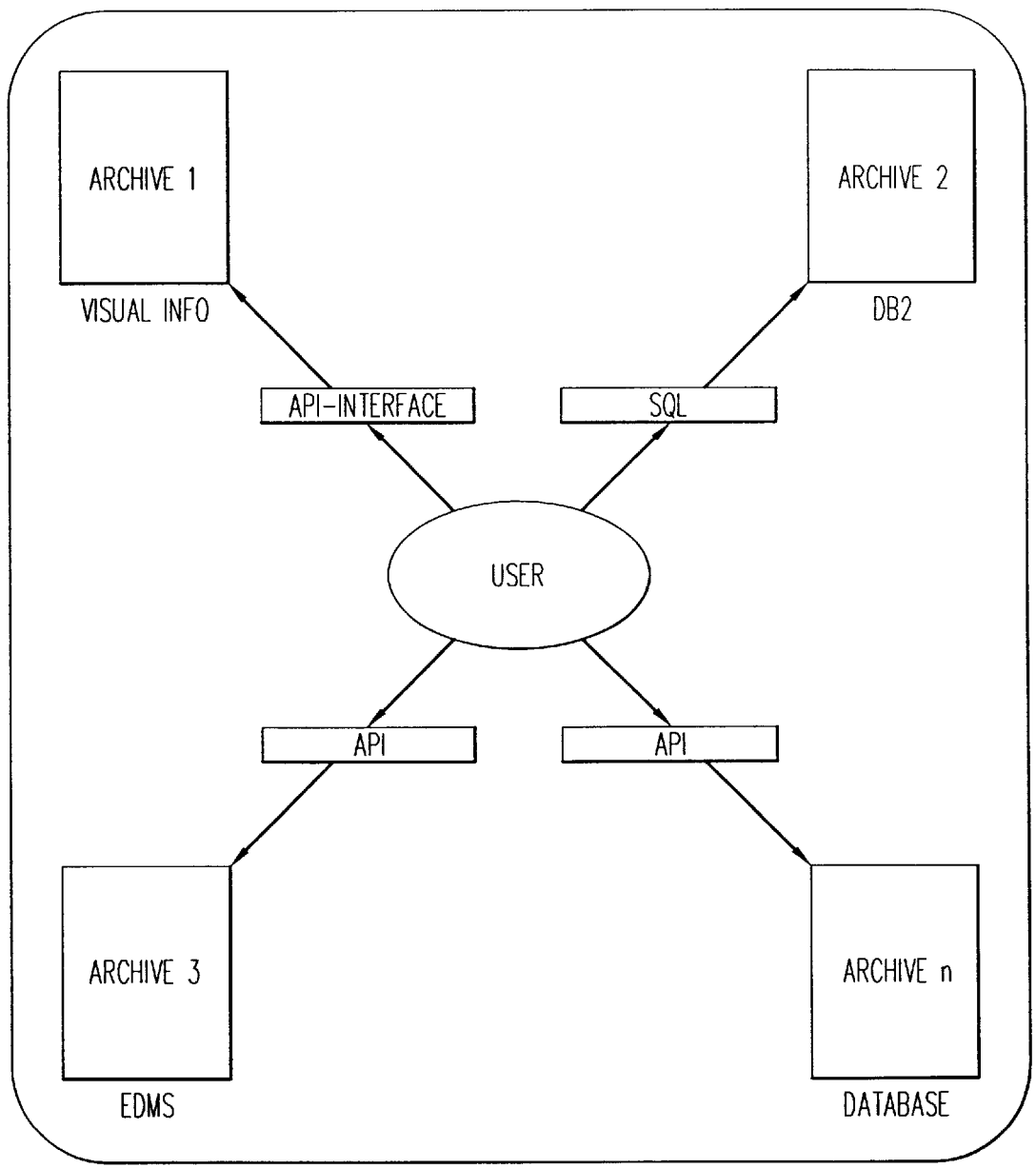
FIG. 1 shows a communications architecture between the user and several different archiving systems according to the prior art, communication with each archiving system being conducted via an API.
Figure 2:
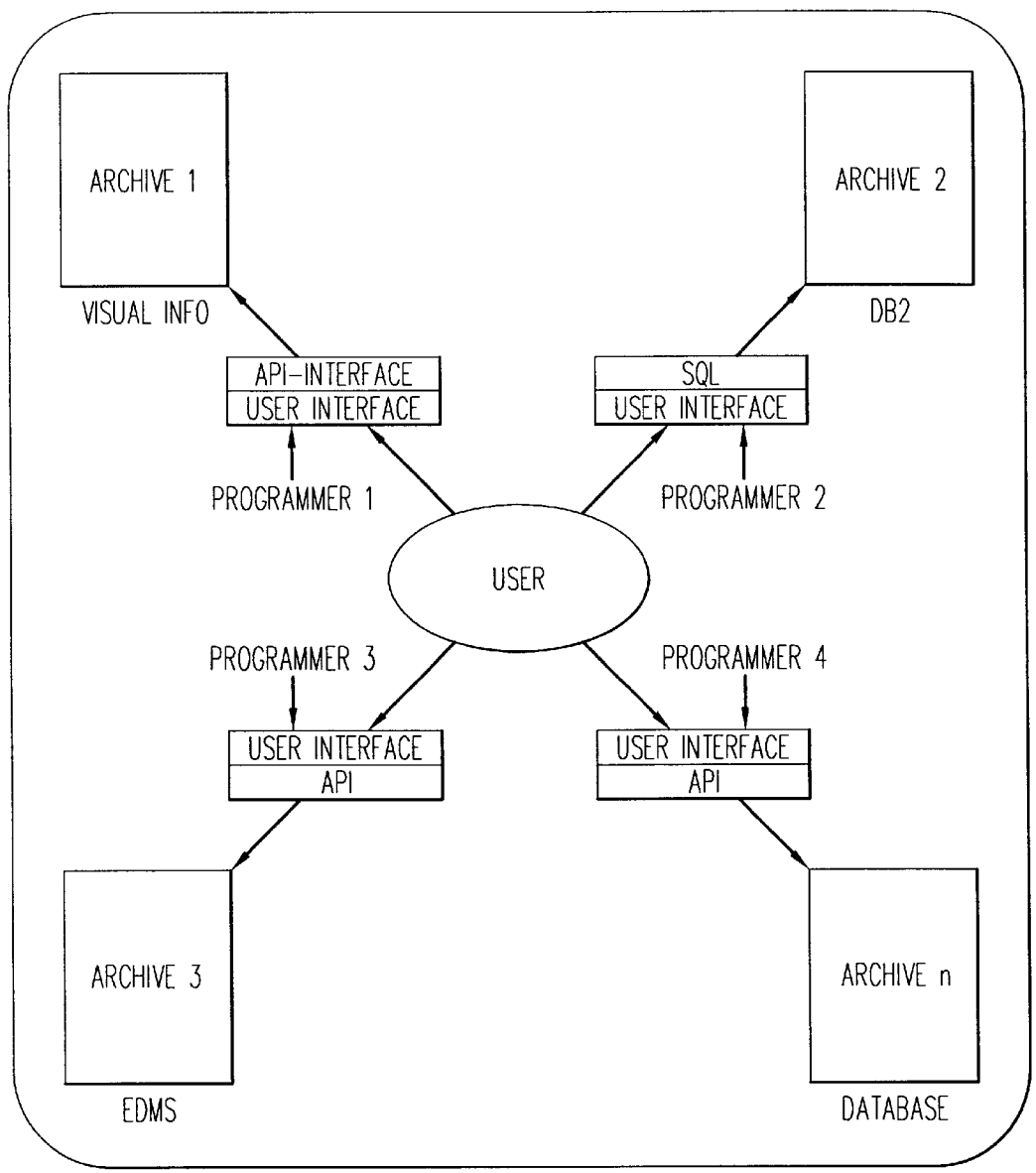
FIG. 2 shows a communications architecture according to FIG. 1 which makes a dedicated user interface necessary on the user side for each archiving system.
Figure 3:
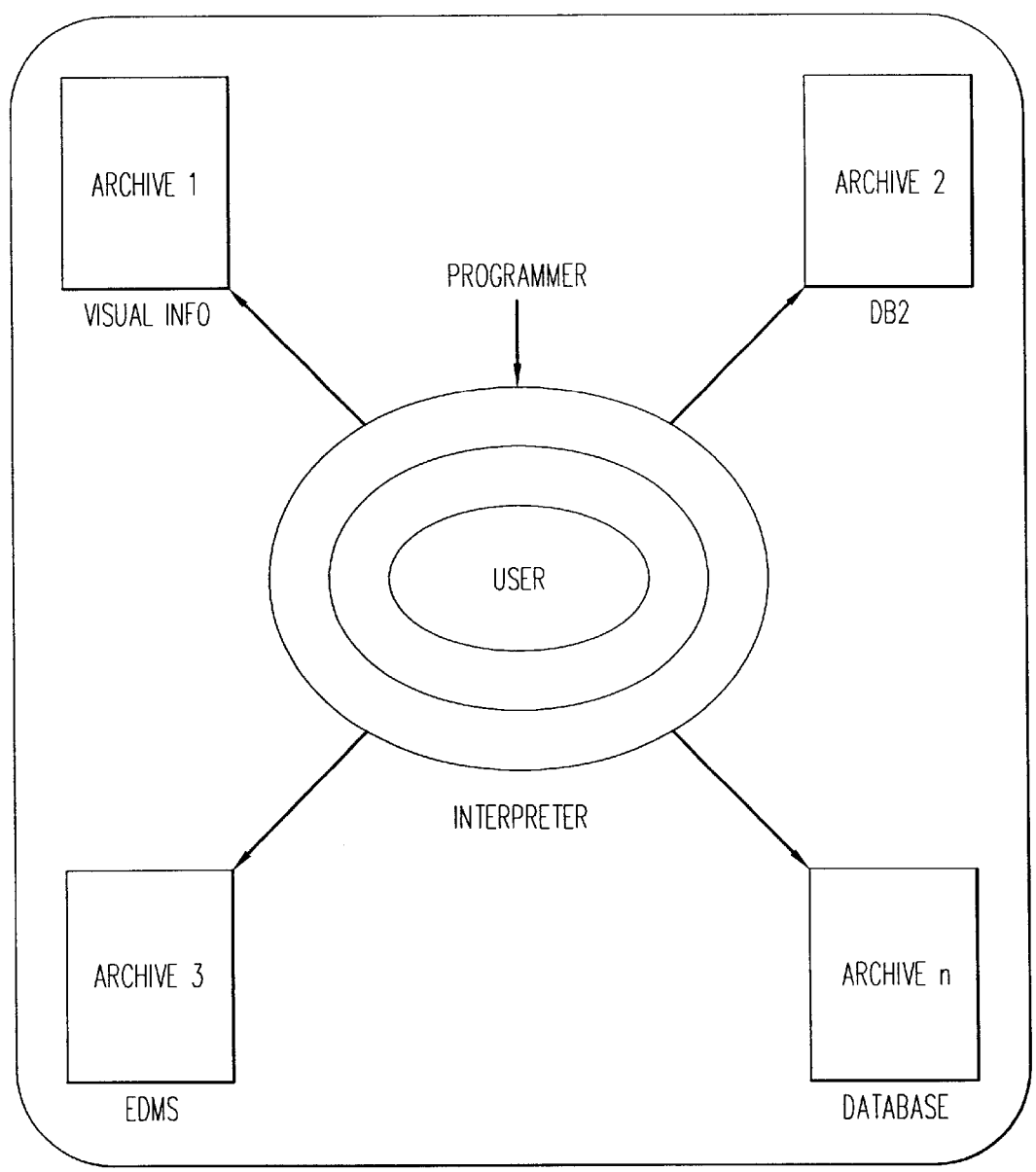
FIG. 3 shows the communications architecture of the invention with the interpreter in accordance with the invention.

FIG. 3 describes the inventive solution with a standard user interface for communicating with various archiving systems A1–An. The inventive solution is based on the use of an interpreter, which receives an inquiry in an non-archive-system-specific form, converts this inquiry to an archive-specific form or assigns it to an archive-specific form and executes the inquiry in the archive system selected. Further processing of the inquiry results can likewise be effected in the interpreter.

Figure 4:
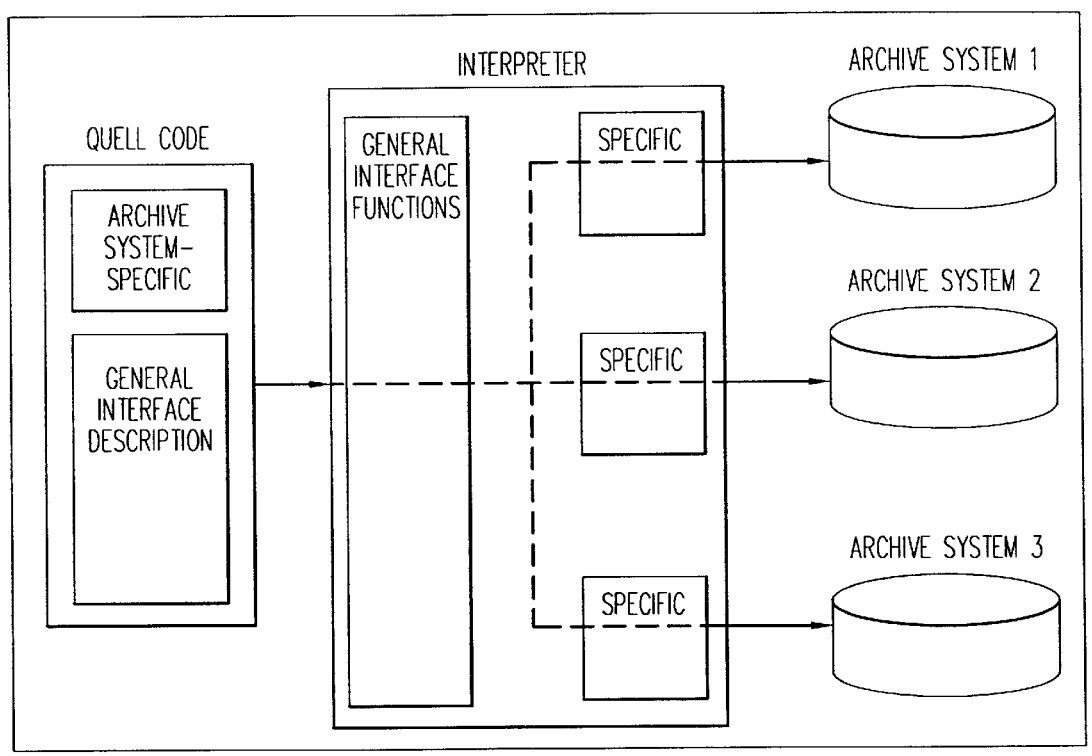
FIG. 4 shows the structure of the interpreter in accordance with the invention acting in combination with the various archiving systems.

FIG. 4 describes the structure of the interpreter in accordance with the invention. The interpreter receives the inquiry in a non-archive-system-specific form. The interpreter itself consists of an archive-system-specific part and a part for generating the inquiry and managing it in the interpreter. The archive-system-specific part consists for its part of several archive-specific components 1–n, which receive the inquiry parameters, convert them into a specific form for the respective archive system and forward them to the respective archive system 1–n.

The part for generating the inquiry and managing it has on the one hand the task of receiving the inquiry parameters in a non-archive-system-specific form and managing them and guaranteeing communication with the user (user interface).

Figure 5:
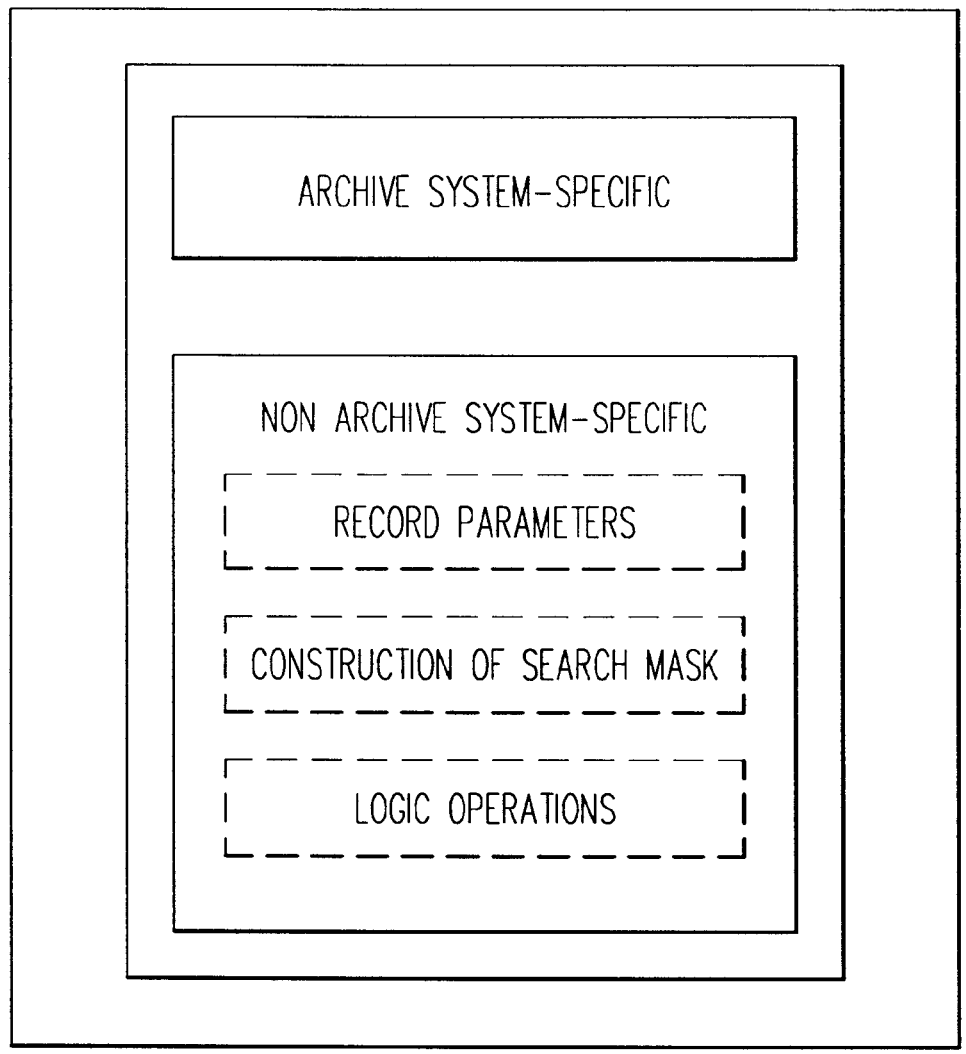
FIG. 5 shows the structure of the document search language.

FIG. 5 describes the structure of the non-archive-system-specific form as developed by a programmer for generating the inquiry.

The non-archive-system-specific form consists of the following parts:

an archive-system-specific part a non-archive-system-specific part.

The archive-system-specific part contains the information for identifying the archive-system-specific components in the interpreter.

The non-archive-system-specific part contains information regarding the inquiry parameters, their logic operation (AND/OR) and information regarding communication with the user (graphical user interface).

Figure 6:
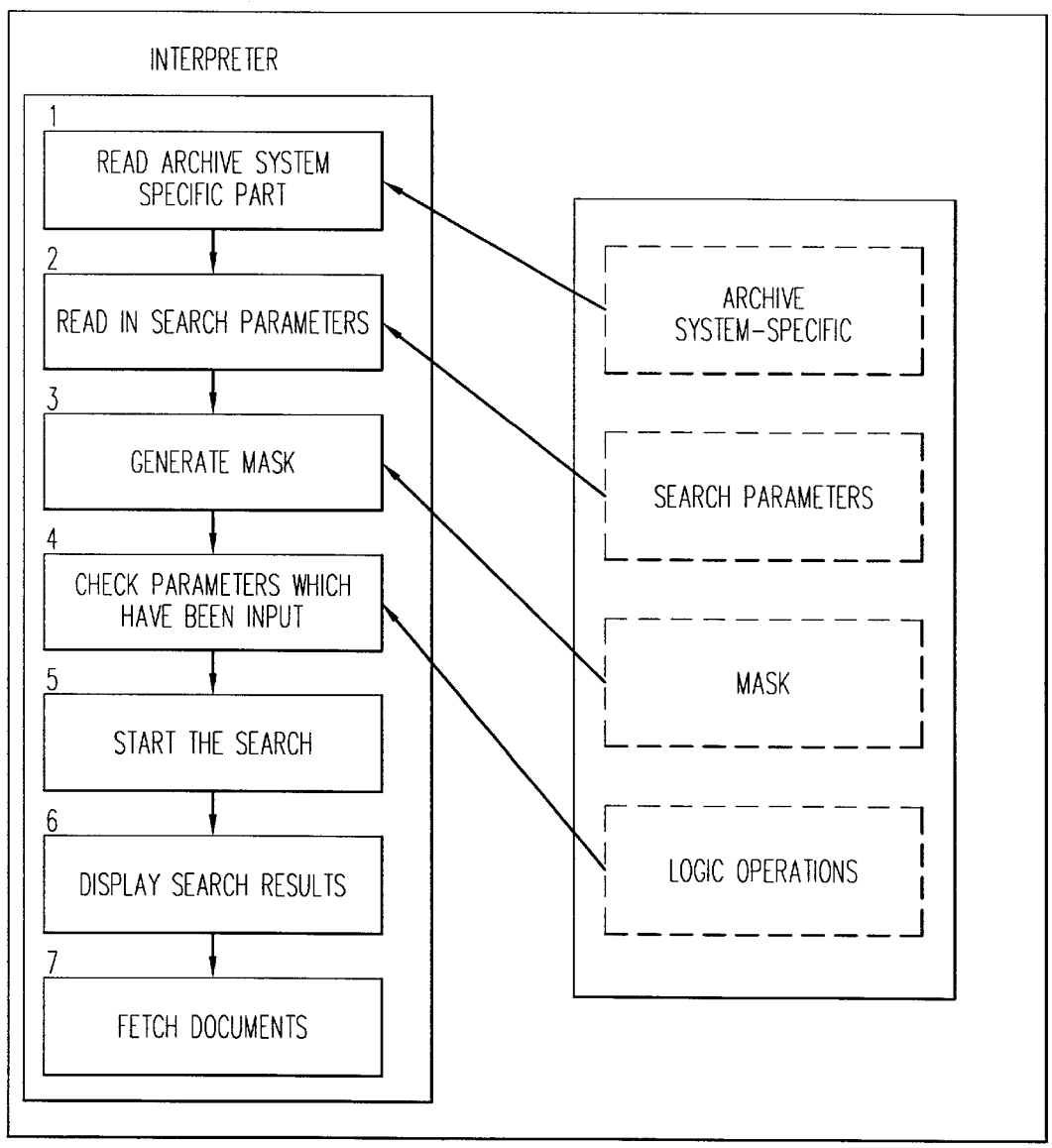
FIG. 6 shows the execution of an archive search in an interpreter in accordance with the invention taking account of the document search language.

FIG. 6 describes the mode of operation of the interpreter in accordance with the invention in connection with an input form which corresponds to the structure according to FIG. 5. The interpreter first reads the archive-system-specific part in from the input form. The search parameters are then read in by the interpreter from the input form. In the next step, the interpreter generates an interface (e.g. graphical user interface/mask) for communicating with the user using the information from the input form.

Syntactical and semantic checking of the inquiry parameters then takes place with the aid of the logic operations specified in the input form. The inquiries are executed in the archive-specific components using the inquiry parameters and their logic operations. The inquiry result is made available to the user via the user interface. Further processing of the inquiry results takes place in the same manner through the interpreter.

Figure 7:
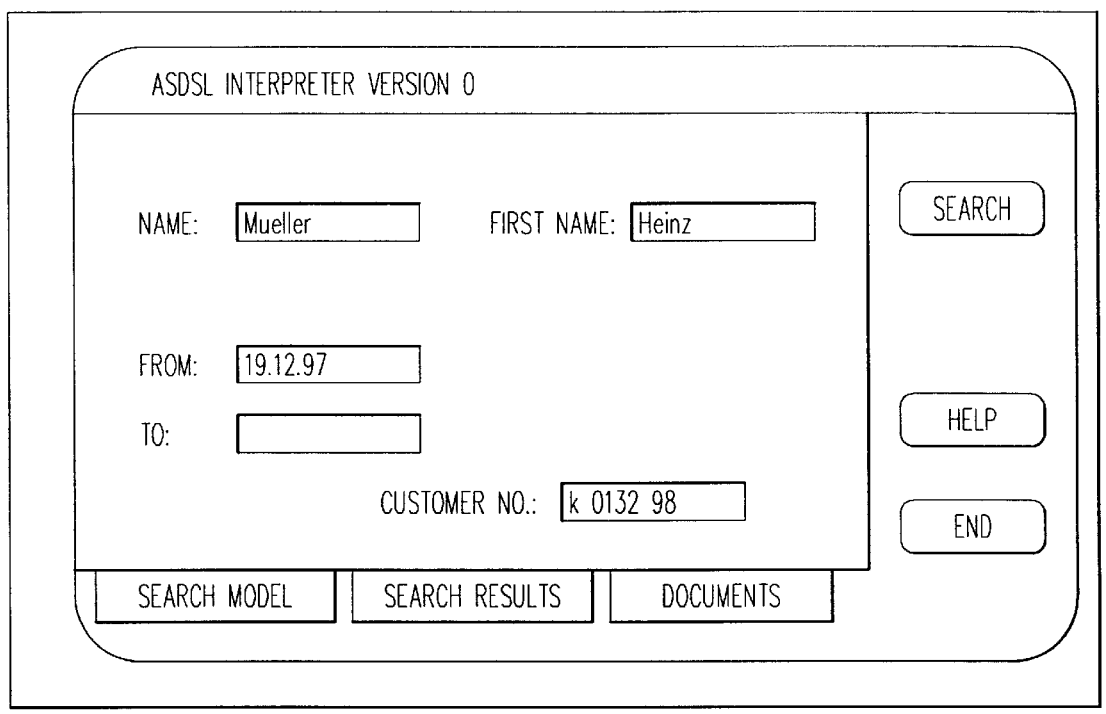
FIG. 7 shows an example of a search mask for the archive search according to FIG. 6.

FIG. 7 describes a preferred example for implementation of a user interface for inputting a search request.

The structure of the archive-system-independent input form in accordance with the invention is to be explained with reference to an example of an archiving system.

The archive-system-independent search language in accordance with the invention comprises the following functionalities:

Archive-system-specific parameters have to be recorded.

The required parameters have to be recorded (parameter name, parameter type etc.)

Data for the creation of the search mask have to be recorded.

Logic operations between the parameters have to be defined.

The required functionalities can be subdivided into two groups:

Archive-system-specific part

I. Non-archive-system-specific part

The non-archive-system-specific part can now be broken down into three further parts:

. Record parameters

I. . Construct search mask

II. . Logic operations

The inventive document search language is illustrated and explained taking an archive system as an example with reference to the programming of an example program:

<START>
    TEST;
    OBJECT FAMILY(testname);
</START>
<VAR>

| STR must1 | :kid1; |
|---|---|
| STR and1 | :kid2; |
| INT and2 | :kid3; |
| DATE or1 | :kid4; |
| DATE or2 | :kid5; |
| REAL 11 | :kid6; |
| REAL 12 | :kid7; |
| REAL 13 | :kid8; |

-continued

| REAL 14 | :kid9; |
|---|---|

```
</VAR>
<SEARCHMASK>
    TEXT(20,50,1,'Some Examples for Check Cases');
    TEXT (20,280,1,'MUST:')
    ENTRY(must1,20,250,1,100,20,");
    TEXT(20,200,1,'AND:');
    PULLDOWN(and1,20,30,1,200,150);
    PULLDOWN(and2,250,30,1,200,150);
    ITEM(and1,'Hello');
    ITEM (and1,'World');
    ITEM(and1,'Hello World');
    ITEM(and2,'123');
    ITEM(and2,'456');
    ITEM(and2,'False');
    TEXT(30,280,2,'OR:');
    CHECK(or1,20,250,2,100,20,'1st Date','19.02.1992');
    CHECK(or2,200,250,2,100,20,'2nd Date','15.04.1992')
    TEXT(20,150,2,'LARGER: 100"');
    ENTRY(11,20,120,2,100,20,");
    TEXT(20,50,2,'LARGER-EQUAL: 100');
    ENTRY(13,20,20,2,100,20,");
</SEARCHMASK>
<CHECK>
    MUST (must1);
    AND(and1, and2);
    OR (or1,or2);
    SET(12,'100');
    LARGER(11,12);
    SET(14,'100');
    LAEQ(13,14);
</CHECK>
<EOF>
```

The four parts are to be specified in the order

| IV.. | <START> |
| V.. | <VAR> |
| VI.. | <SEARCHMASK> |
| VII.. | <CHECK> |

The start and end of each section are indicated by the appropriate TAGS. In general it is the case that the start is always marked by "<[Section name]>" and the end by "</[Section name]>".

The functionality of the individual sections is:

VIII.. START:
  The parameters which are required for calling the individual archive systems are specified here.
IX.. VAR:
  The specific search parameters are allocated to the various types here.
X.. SEARCHMASK:
  The layout of the search mask is defined here.
XI.. CHECK:
  The checking conditions which have to be satisfied before the search inquiry is started are established here.

The end of the program is indicated by "<EOF>". All characters after <EOF> are ignored by the interpreter.

Various commands which are needed for programming the search mask and the interpreter are available in each program part. These commands are bound to the individual program parts and are not known outside these program parts. This means that an entry field can only be generated for example in the program part 'SEARCHMASK' and not in 'START', 'VAR' or 'CHECK'.

What is claimed is:

1. A method for generating and executing search requests for a plurality of archive systems of which two or more use different query languages, comprising:

a) generating a search request containing at least archive-system-specific information for addressing a selected one of said plurality of archive systems and non-archive-system-specific search information in an archive-system-independent language;

b) handing over the search request to an interface with said plurality of archive systems;

c) ascertaining the selected archive system from the search request;

d) allocating the non-archive-system-specific search information according to step a) to appropriate archive-system-specific search parameters;

e) executing the archive-system-specific search parameters by communication with only the selected archive system.

2. The method according to claim 1, wherein steps a) to e) are executed by a program with an interpreter architecture.

3. The method according to claim 2, wherein the interpreter architecture comprises a standard user interface with a user and said interface that includes a dedicated archive system interface with each archive system.

4. The method according to claim 3, wherein the standard user interface supplies a user with a search mask for inputting the search request according to step a).

5. The method according to claim 3, wherein the standard user interface supplies a function for developing a user-defined search mask.

6. The method according to claim 3, wherein the archive-system-independent search request generated by step a) is forwarded to the dedicated archive-system interface for the selected archive system and said archive-system-specific parameters of step c) are forwarded for execution to said selected archive system.

7. The method according to claim 3, wherein the archive-system-independent search request generated by step a) is forwarded to the dedicated archive-system interface for the selected archive system and said archive-system-specific parameters of step c) are converted into directly executable search requests.

8. The method according to claim 3, wherein the dedicated archive-system interface can access a table in which each non-archive-system-specific parameter is assigned to an archive-system-specific parameter.

9. The method according to claim 3, wherein a search result is transmitted from said selected archive system via the dedicated archive-system interface therefore to the standard user interface.

10. The method according to claim 1, wherein step a) is executed via a standard user interface.

11. The method according to claim 1, further comprising development of a user-defined search mask that comprises the following steps:

aa) establishment of parameters for determining which ones of said plurality of archive systems are available;

bb) allocation of search parameters to the available archive systems established by step aa);

cc) definition of representation for said search mask; and dd) establishment of semantic and syntactical checking conditions for executing a search request.

12. The method according to claim 11, wherein said development of said user-defined search mask is executed in said archive-system-independent language.

13. The method according to claim 11, wherein steps a) to e) are executed by a program with an interpreter architecture, and wherein steps a)–e) are only executed if steps aa) to dd) have been executed by said program.

14. The method according to claim 11, wherein steps a) to e) are executed by a program with an interpreter architecture, and wherein steps aa)–dd) are executed automatically by said program when search request is initiated.

15. An interrogation system for a plurality of archive systems of which two or more use different query languages comprising:

a user interface and a dedicated archive system interface for each one of said plurality of archive systems;

means for generating a search request containing at least archive-system-specific information for addressing a selected one of said plurality of archive systems and non-archive-system-specific search information in an archive-system-independent language;

means for analysing and determining said selected archive system type from said archive specific information and one or more archive-system-specific search parameters from said non-archive-system-specific search information;

means for keeping said archive-system-specific parameters ready;

means for causing the execution of the archive-system-specific parameters in the selected archive system; and means for communicating with only the selected archive system to forward a result of the search to the user interface.

16. The interrogation system according to claim 15, wherein the user interface includes a development function.

17. The interrogation system according to claim 16, wherein the development function is definable by establishment of parameters for determining which ones of the plurality of archive systems are available, allocating search parameters to the available archive systems, defining a display for the user interface and establishment of semantic and syntactical checking conditions for the execution of a search request.

18. A method for operating an interpreter which provides a standard user interface, said interpreter generating and executing search requests with respect to plural heterogeneous archive systems, said method comprising the steps of:

a) receiving an inquiry to one of said plural heterogeneous archive systems via said standard user interface in a non-archive-system-specific form; and b) processing the inquiry in a manner to enable said interpreter to communicate said processed inquiry only to said one of said plural heterogeneous archive systems.

19. The method as recited in claim 18, wherein the processing of the inquiry converts said inquiry to an archive-specific form.

20. The method as recited in claim 18, wherein the processing of the inquiry assigns said inquiry to an archive-specific form.

21. The method as recited in claim 18, wherein step b) generates a search mask and translates search criteria designated by the inquiry in accord with the following substeps:

b1) recognizing and storing archive-system-specific data from the inquiry, recognising which one of a plurality of dedicated archive system interfaces has to be used with the archive system to which the inquiry is directed;

b2) inputting search parameters and assigning a defined type to the search parameters;

b3) constructing a search mask for the archive system;

b4) verifying correctness of parameters of the search mask which have been entered; and b5) causing a search to be started in said one of said plural heterogeneous archive systems.

* * * * *